(12) United States Patent
Nakano et al.

(10) Patent No.: US 7,203,606 B2
(45) Date of Patent: Apr. 10, 2007

(54) INFORMATION PROCESSING APPARATUS FOR NUMERICALLY ANALYZING INCOMPRESSIBLE FLUID AND METHOD THEREFOR

(75) Inventors: Kota Nakano, Tokyo (JP); Akira Asai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/275,142

(22) Filed: Dec. 15, 2005

(65) Prior Publication Data

US 2006/0129337 A1   Jun. 15, 2006

(30) Foreign Application Priority Data

Dec. 15, 2004   (JP) ............................. 2004-363676

(51) Int. Cl.
*G01F 17/00* (2006.01)
(52) U.S. Cl. ......................................... 702/50; 73/116
(58) Field of Classification Search ................. 702/45, 702/50, 100, 127, 183, 14; 73/116, 864.21
See application file for complete search history.

(56) References Cited

U.S. PATENT DOCUMENTS

| | | | |
|---|---|---|---|
| 6,324,480 B1 * | 11/2001 | Takahashi et al. ............ | 702/50 |
| 6,574,563 B1 * | 6/2003 | Nickel ......................... | 702/14 |
| 7,017,399 B2 * | 3/2006 | Yokohata et al. ............. | 73/116 |
| 2003/0060988 A1 * | 3/2003 | Ginzburg ..................... | 702/50 |
| 2005/0288875 A1 * | 12/2005 | Sugioka ....................... | 702/50 |

* cited by examiner

*Primary Examiner*—John E. Barlow, Jr.
*Assistant Examiner*—John Le
(74) *Attorney, Agent, or Firm*—Fitzpatrick, Cella, Harper & Scinto (57) ABSTRACT

During an incompressible fluid movement, three consecutive times during the movement of the fluid are called first, second, and third times in time order, calculation is performed with two different types of lattices for the first and third times and for the second time. Momentum and mass density at the first time are temporally developed to the third time in accordance with a conservation law by using an upwind velocity field. A pressure at the second time is determined so that a velocity field derived from momenta at the third time satisfies an incompressibility condition, and the field at the third time is corrected by adding a change in momentum caused by a pressure term using the determined pressure. This prevents pressure vibration and avoids the complexity of advective term calculation.

6 Claims, 4 Drawing Sheets

INFORMATION PROCESSING APPARATUS FOR NUMERICALLY ANALYZING INCOMPRESSIBLE FLUID AND METHOD THEREFOR

BACKGROUND OF THE INVENTION

1. Field of the Invention

The present invention relates to an information processing apparatus that numerically analyzes an incompressible fluid and a method therefor.

2. Description of the Related Art

An equation of motion that describes an incompressible fluid includes a term (pressure term) indicating that a fluid is accelerated by a pressure, and a term (advective term) indicating that a momentum is conveyed such that the fluid itself flows.

Regarding pressure, methods that numerically analyze incompressible fluids include two typical methods, one using calculus of finite differences and the other one using a finite element method (see "Nagare-no Suchi Shimyureshon (Numerical Simulation of Fluid)", Japan Society of Mechanical Engineers, Corona Publishing Co., Ltd.). To use the calculus of finite differences (central difference for pressure), a method, called a "staggered mesh technique", of placing physical quantities is commonly used.

In the staggered mesh technique, a spatial component of the momentum of a fluid and its pressure are all placed at different points. When the staggered mesh technique is not used, a contrivance, such as raising the accuracy of spatial differentiation of pressure, is needed. If such a contrivance is not performed, nonphysical vibration occurs in a pressure field. Although, in the finite element method, a definition point of a momentum vector and a definition point of pressure can be placed at the same point, when a pressure Poisson's equation concerning an incompressible fluid is solved, it is necessary to increase the order of an interpolation function of a velocity field rather than increasing the order of an interpolation function of pressure. In addition, the finite element method has a numerical calculation load larger than that of the calculus of finite differences.

Regarding the advective term, a case in which the definition points of physical quantities are placed at the same point is less complicated as a method.

SUMMARY OF THE INVENTION

The present invention provides a fluid analyzing technology in which, even if the momentum of a fluid, a mass density, and a definition point of pressure are placed at the same lattice point while using a central difference for spatial differentiation in the case of solving a pressure equation, no pressure vibration occurs.

The present invention also provides a fluid analyzing technology that avoids complication in calculating an advective term of fluid.

According to an aspect of the present invention, an information processing apparatus for analyzing an incompressible fluid movement is provided which includes an initial value storing unit which stores initial values of momenta and mass densities at virtual lattice points disposed in a space set based on the assumption that a fluid subject to calculation exists in the space, and a calculating unit which calculates, based on the initial values, momenta and mass densities at times during a movement of the fluid. The calculation unit includes a temporal development unit which, when three consecutive times during the movement of the fluid are referred to as first, second, and third times in the order of a lapse of time, performs calculation by using two different types of lattices for the first and third times and, for the second time, and which, regarding advection of momenta and mass densities, temporally develops the momenta and mass densities at the first time to the third time in accordance with a conservation law by using an upwind velocity field at the second time, a pressure determining unit which determines a pressure at the second time so that a velocity field derived from momenta at the third time satisfies an incompressibility condition, and a correcting unit which corrects the velocity field at the third time by adding a change in momentum which is caused by a pressure term using the pressure determined by the pressure determining unit.

According to another aspect of the present invention, an information processing method is provided in which, in an information processing apparatus including initial value storing unit which stores momenta and mass densities as initial values at virtual lattice points disposed in a space set based on the assumption that a fluid subject to calculation exists in the space, momenta and mass densities at times during a movement of the fluid are calculated based on the initial values. The information processing method analyzes an incompressible fluid movement and includes a temporally developing step of, when three consecutive times during the movement of the fluid are referred to as first, second, and third times in the order of a lapse of time, performing calculation by using two different types of lattices for the first and third times and for the second time, and, regarding advection of momenta and mass densities, temporally developing the momenta and mass densities at the first time to the third time in accordance with a conservation law by using an upwind velocity field at the second time, a pressure determining step of determining a pressure at the second time so that a velocity field derived from momenta at the third time satisfies an incompressibility condition, and a correcting step of correcting the velocity field at the third time by adding a change in momentum which is caused by a pressure term using the pressure determined in the pressure determining step.

Other advantages besides those discussed above shall be apparent to those skilled in the art from the description of an embodiment of the invention which follows. In the description, reference is made to accompanying drawings, which form a part thereof, and which illustrate an example of the invention. Such an example, however, is not exhaustive of the various embodiments of the invention, and therefore reference is made to the claims which follow the description for determining the scope of the invention.

Further features of the present invention will become apparent from the following description of an exemplary embodiment with reference to the attached drawings.

DESCRIPTION OF THE EMBODIMENTS

An embodiment of the present invention is described below with reference to the accompanying drawings.

Calculation for Analyzing Incompressible Fluid Movement

At first, calculation for analyzing an incompressible fluid movement is described below.

An equation that describes an incompressible fluid is represented by $$\frac{\partial}{\partial t}\rho + \frac{\partial}{\partial x^k}(\rho u^k) = 0 \tag{1}$$

$$\frac{\partial}{\partial t}(\rho u^i) + \frac{\partial}{\partial x^k}(\rho u^i u^k) + \frac{\partial}{\partial x^i}p = 0 \tag{2}$$

$$\frac{\partial}{\partial x^k}u^k = 0 \tag{3}$$

where $\rho$ represents a mass, and $\vec{u} = (u^1, u^2)$ represents a velocity.

Discretization of the above equations is performed concerning time, as follows:

$$\frac{\rho^{n+1} - \rho^n}{\Delta t} + \frac{\partial}{\partial x^k}\left(\rho^n u^{n+\frac{1}{2}k}\right) = 0 \tag{4}$$

$$\frac{\rho^{n+1} u^{n+1i} - \rho^n u^{ni}}{\Delta t} + \frac{\partial}{\partial x^k}\left(\rho^n u^{ni} u^{n+\frac{1}{2}k}\right) + \frac{\partial}{\partial x^i}p^{n+\frac{1}{s}} = 0 \tag{5}$$

where the superscripts n, n+½, and $n$+1 represent time steps, and $$\rho^n \vec{u}^n \text{ and } \vec{u}^{n+\frac{1}{2}}$$

represent known quantities.

From expression (4), $$\rho^{n+1} = \rho^n - \Delta t \frac{\partial}{\partial x^k}\left(\rho^n u^{n+\frac{1}{2}k}\right) \tag{6}$$

As an intermediate variable, $\tilde{u}^{n+1}$ is defined by $$\rho^{n+1} \tilde{u}^{n+1i} \equiv \rho^{n+1} u^{n+1i} - \Delta t \frac{\partial}{\partial x^k}\left(\rho^n u^{ni} u^{n+\frac{1}{2}k}\right) \tag{7}$$

From expression (5), $$\rho^{n+1} \frac{u^{n+1i} - \tilde{u}^{n+1i}}{\Delta t} + \frac{\partial}{\partial x^i} p^{n+\frac{1}{2}} = 0 \tag{8}$$

When requesting an incompressibility condition from expression (8), $$\frac{\partial}{\partial x^k}\tilde{u}^{n+1k} - \frac{\partial}{\partial x^k}\left(\frac{\Delta t}{\rho^{n+1}}\frac{\partial}{\partial x^k}p^{n+\frac{1}{2}}\right) = 0 \tag{9}$$

expression (9) is solved for $$p^{n+\frac{1}{2}}.$$

By using solution $$p^{n+\frac{1}{2}},$$

$$u^{n+1i} = \tilde{u}^{n+1i} - \frac{\Delta t}{\rho^{n+1}}\frac{\partial}{\partial x^i}p^{n+\frac{1}{2}} \tag{10}$$

By repeating the above operation, time progress is performed. In this embodiment, two types of calculation lattices M and $\tilde{M}$ are used. Position vectors $r_M$ and $r_{\tilde{M}}$ at the two types of lattice points are represented by $$\begin{cases} r_M = i\vec{e}_1 + j\vec{e}_2 \\ r_{\tilde{M}} = \left(i+\frac{1}{2}\right)\vec{e}_1 + \left(j+\frac{1}{2}\right)\vec{e}_2 \end{cases}$$

where i,j$\in$Z, $\vec{e}_1 = (\Delta x, 0)$, $\vec{e}_2 = (0, \Delta y)$, and $\Delta x$ and $\Delta y$ represent lattice intervals.

Figure 2:
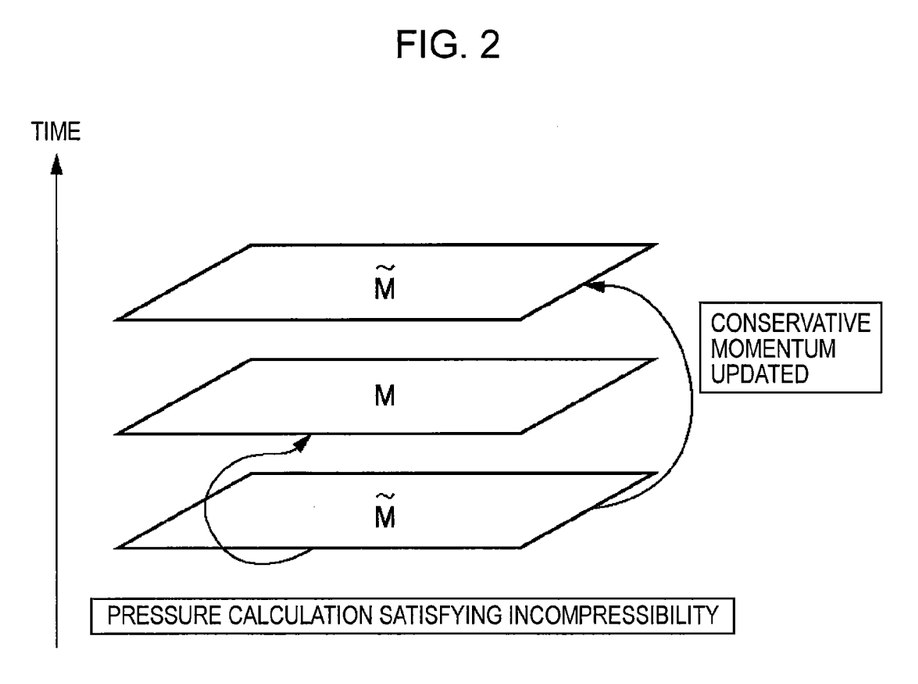
FIG. 2 is an illustration of time intervals of two lattice points.
Figure 4:
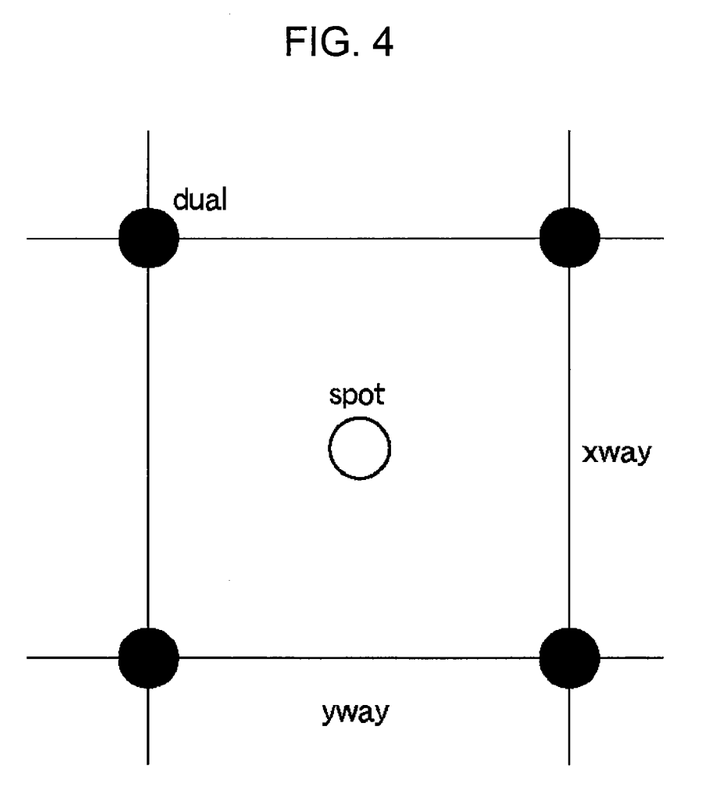
FIG. 4 is an illustration of, in one lattice, the cell center "spot", the lattice point "dual", and the sides "xway" and "yway".

In addition, as shown in FIG. 2, it is assumed that two calculation lattices M and $\tilde{M}$ are alternatively placed at time intervals of $\Delta t/2$. FIG. 2 illustrates time intervals of the two lattice points. As shown in FIG. 4, in one lattice, the center of a cell is referred to as a "spot", each of the lattice points is referred to as a "dual", each of right and left sides to the spot is referred to as an "xway", and each of upper and lower sides to the spot is referred to as a "yway". FIG. 4 illustrates the cell center "spot", the lattice points "dual", and the sides "xway" and "yway".

Figure 1:
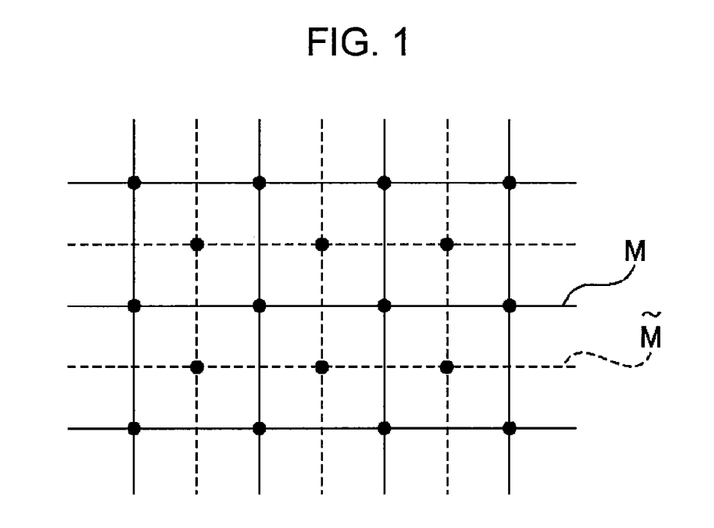
FIG. 1 is a diagram showing a relationship between two calculation lattices.
Figure 3:
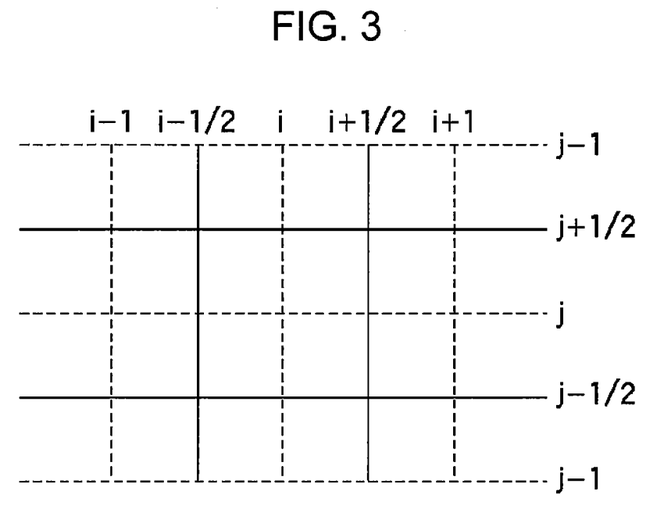
FIG. 3 is an illustration of positional relationships represented by variables i and j.

Next, calculation, using the foregoing, for analyzing an incompressible fluid movement, is described below. In addition, subscript variable i and j used in the following description are shown in FIG. 3. FIG. 3 shows positional relationships represented by variables i and j. FIG. 1 shows a relationship between two calculation lattices M and $\tilde{M}$.

(1) At first, $$\rho_D^{n+\frac{1}{2}},$$

and $$\vec{u}_D^{n+\frac{1}{2}}$$

are given on a dual lattice point.

(2)

$$\rho^{n+\frac{1}{2}}$$

on an xway is assumed to be $$\rho^{n+\frac{1}{2}}_{(i+\frac{1}{2},j)} = \frac{1}{2}\left(\rho^{n+\frac{1}{2}}_{D(i,j)} + \rho^{n+\frac{1}{2}}_{D(i,j+1)}\right),$$

and $$\rho^{n+\frac{1}{2}}$$

on a yway is assumed to be $$\rho^{n+\frac{1}{2}}_{(i+\frac{1}{2},j)} = \frac{1}{2}\left(\rho^{n+\frac{1}{2}}_{D(i,j)} + \rho^{n+\frac{1}{2}}_{D(i+1,j)}\right).$$

(3)

$$\tilde{u}^{n+\frac{1}{2}x}$$

on an xway is assumed to be $$\tilde{U}^{n+1}_{(i,j+\frac{1}{2})} = \frac{1}{2}\left(\tilde{u}^{n+\frac{1}{2}x}_{D(i,j)} + \tilde{u}^{n+\frac{1}{2}x}_{D(i,j+1)}\right),$$

and $$\tilde{u}^{n+\frac{1}{2}y}$$

on the yway is assumed to be $$\tilde{V}^{n+1}_{(i,j+\frac{1}{2})} = \frac{1}{2}\left(\tilde{u}^{n+\frac{1}{2}y}_{D(i,j)} + \tilde{u}^{n+\frac{1}{2}y}_{D(i+1,j)}\right).$$

(4) Simultaneous equation $$\left(\frac{\partial}{\partial x}, \frac{\partial}{\partial y}\right) \cdot \left[\begin{pmatrix} \tilde{U}^{n+\frac{1}{2}} \\ \tilde{V}^{n+\frac{1}{2}} \end{pmatrix} - \frac{\Delta t}{\rho^{n+\frac{1}{2}}} \begin{pmatrix} \frac{\partial p_S^n}{\partial x} \\ \frac{\partial p_S^n}{\partial y} \end{pmatrix}\right] = 0$$

concerning $$p_s^{n+\frac{1}{2}}$$

is solved by a conjugate gradient method.

(5) By using solution $$p_s^{n+\frac{1}{2}},$$

increment $$(\Delta U^{n+\frac{1}{2}}, \Delta V^{n+\frac{1}{2}})$$

in velocity field a time b+½ is assumed to be $$\Delta U^{n+\frac{1}{2}}_{(i,j+\frac{1}{2})} = -\frac{\Delta t}{\rho^{n+\frac{1}{2}}_{(i,j+\frac{1}{2})}}\left(\frac{p_{S(i,j)}^n - p_{S(i-1,j)}^n}{\Delta x}\right)$$

$$\Delta V^{n+\frac{1}{2}}_{(i+\frac{1}{2},j)} = -\frac{\Delta t}{\rho^{n+\frac{1}{2}}_{(i+\frac{1}{2},j)}}\left(\frac{p_{S(i,j)}^n - p_{S(i,j-1)}^n}{\Delta y}\right)$$

(6) Components, on the zway and the yway, of the velocity field at time n+½ are assumed to be $$U^{n+\frac{1}{2}}_{(i,j+\frac{1}{2})} = \tilde{U}^{n+\frac{1}{2}}_{(i,j+\frac{1}{2})} + \Delta U^{n+\frac{1}{2}}$$

$$V^{n+\frac{1}{2}}_{(i+\frac{1}{2},j)} = \tilde{V}^{n+\frac{1}{2}}_{(i+\frac{1}{2},j)} + \Delta V^{n+\frac{1}{2}}$$

(7) On the dual, the velocity at time n+½ is assumed to be represented by $$u^{n+\frac{1}{2}x}_{D(i,j)} = \tilde{u}^{n+\frac{1}{2}x}_{D(i,j)} + \frac{1}{2}\left(\Delta U^{n+\frac{1}{2}}_{(i,j+\frac{1}{2})} + \Delta U^{n+\frac{1}{2}}_{(i,j-\frac{1}{2})}\right)$$

$$u^{n+\frac{1}{2}y}_{D(i,j)} = \tilde{u}^{n+\frac{1}{2}y}_{D(i,j)} + \frac{1}{2}\left(\Delta V^{n+\frac{1}{2}}_{(i+\frac{1}{2},j)} + \Delta V^{n+\frac{1}{2}}_{(i-\frac{1}{2},j)}\right)$$

(8) $\rho^{n+1}$ on time n+1 is assumed to be $$\rho^{n+1} = \rho^n - \Delta t \left(\frac{\partial}{\partial x}, \frac{\partial}{\partial y}\right) \cdot \left[\rho_S^n \begin{pmatrix} U^{n+\frac{1}{2}} \\ V^{n+\frac{1}{2}} \end{pmatrix}\right]$$

where an upwind difference is used for calculating the right side.

(9) Predictive value $\tilde{J}_S^{n+1i}$ of the momentum is calculated.

$$\tilde{J}_S^{n+1i} \equiv \rho_S^{n+1} \tilde{u}_S^{n+1} = \rho_S^n u_S^{n+1} - \Delta t \left(\frac{\partial}{\partial x}, \frac{\partial}{\partial y}\right) \cdot \left[\rho_S^n u_S^{ni} \begin{pmatrix} U^{n+\frac{1}{2}} \\ V^{n+\frac{1}{2}} \end{pmatrix}\right]$$

where an upwind difference is used for calculating the right side.

(10) After rewriting n by n+1, the process in the above (1) to (9) is repeated.

In the above process, calculation for analyzing the momentum of an incompressible fluid can be performed.

When a computer is allowed to execute this calculation, a known technology may be used concerning, for example, a numerical analyzing method such as a differential equation.

Figure 5:
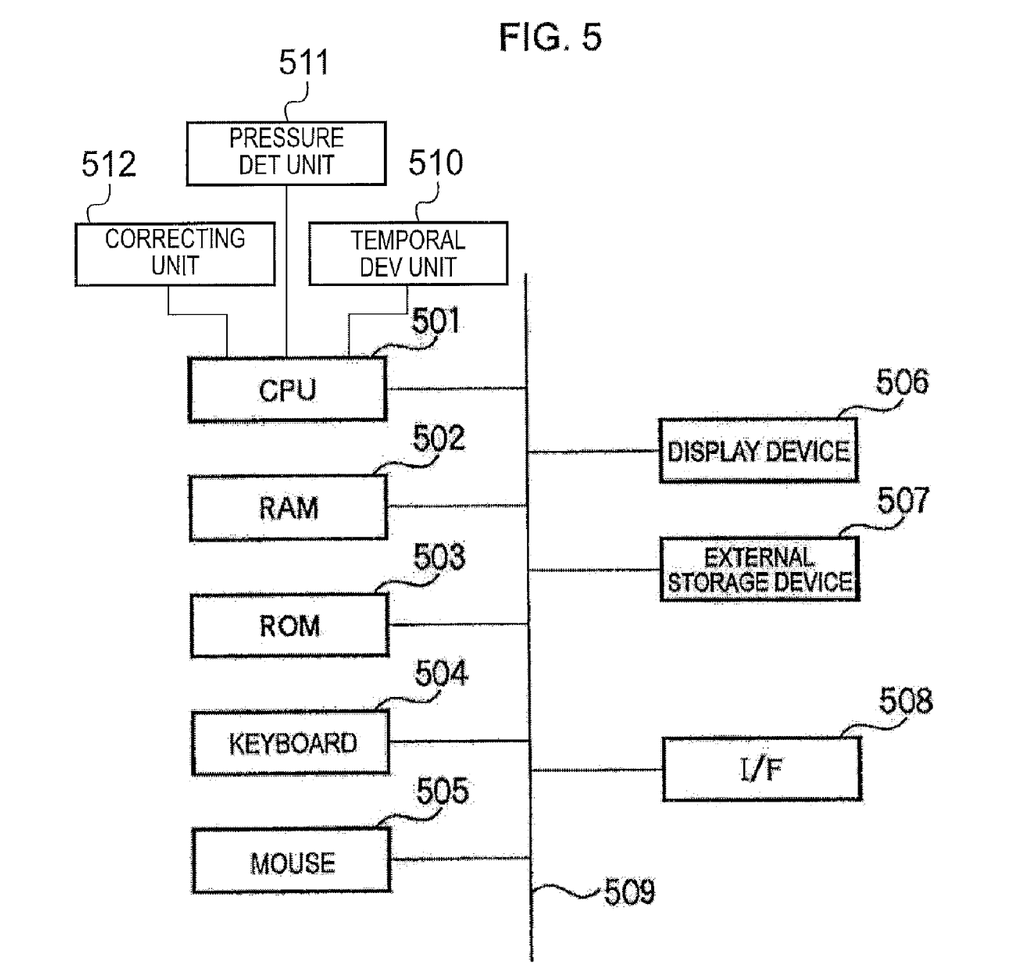
FIG. 5 is a block diagram showing the basic configuration of a computer that executes calculation.

FIG. 5 shows the basic configuration of a computer that executes the above-described calculation.

A central processing unit (CPU) 501 controls the entirety of the computer by using programs and data stored in a random access memory (RAM) 502 and a read-only memory (ROM) 503, and executes the above-described calculation utilizing a temporal development unit 510, a pressure determining unit 511, and a correcting unit 512.

The RAM 502 includes an area for temporarily storing a program and data loaded from an external storage device 507, an area for temporarily storing data received from the exterior through an interface (I/F) 508, and a work area which is used for the CPU 501 to execute various types of processing.

The ROM 503 stores setting data for the computer, a boot program, etc.

A keyboard 504 and a mouse 505 are used to input various instructions to the CPU 501.

A display device 506 is formed by a cathode-ray tube or a liquid crystal screen, and can display the result of processing by the CPU 501 by using images, characters, etc.

The external storage device 507 is formed by a hard disk drive or the like. The external storage device 507 stores an operating system (OS), and programs and data required for the CPU 501 to execute the above-described calculations. Since all or part of the programs and data is loaded into the RAM 502 under the control of the CPU 501, the CPU 501 can perform processing by using the loaded one, so that the computer can perform the above-described calculations.

The interface 508 functions for transmitting/receiving data to/from an external device.

A bus 509 connects the above functional units.

Figure 6:
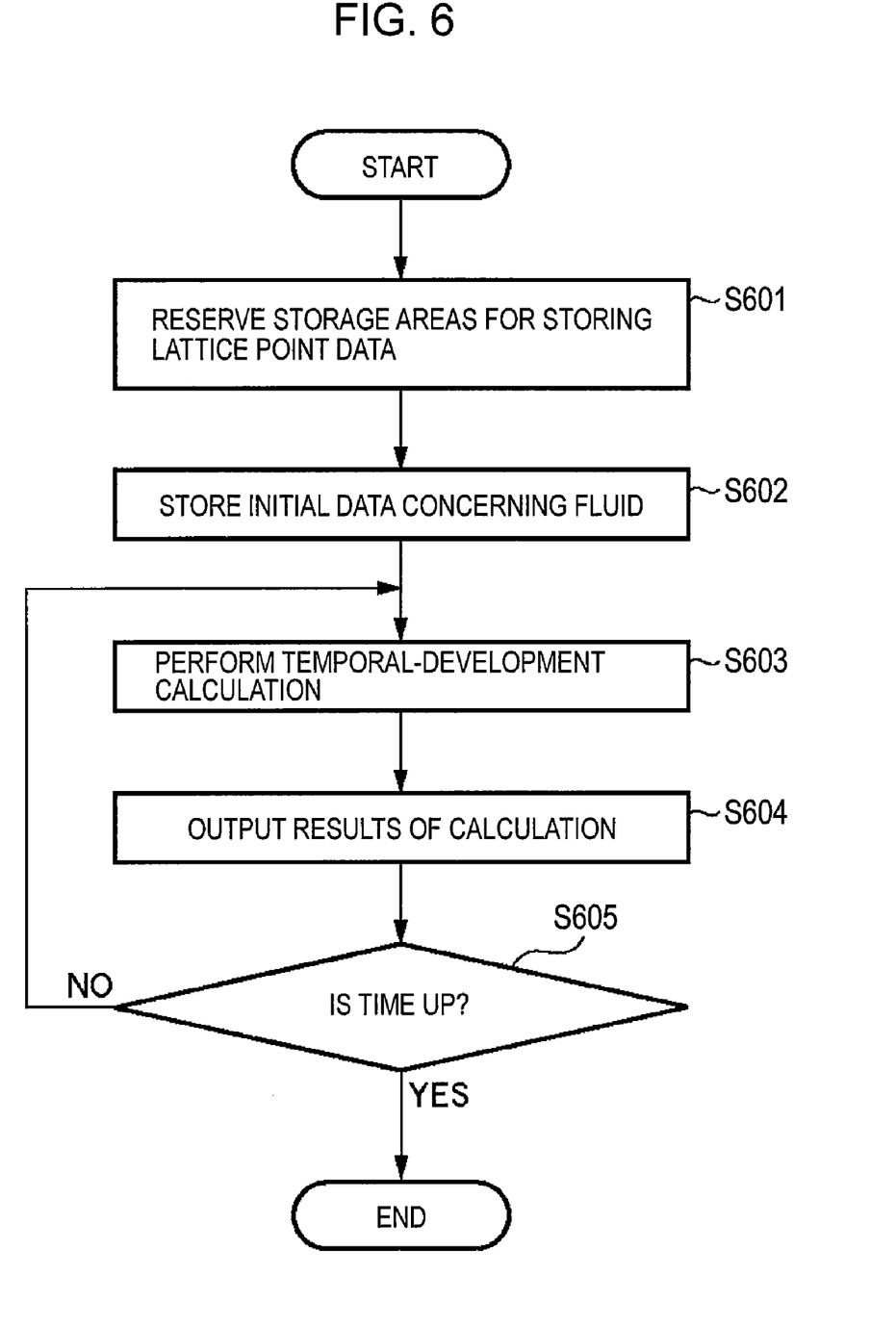
FIG. 6 is a flowchart illustrating calculation for analyzing an incompressible fluid movement.

FIG. 6 is a flowchart illustrating a calculating process, performed by the computer having the above-described configuration, for analyzing an incompressible fluid movement. A program for the CPU 501 executes the process in accordance with the flowchart in FIG. 6, and data are stored in the external storage device 507. The program and data are loaded into the RAM 502 under the control of the CPU 501, and the CPU 501 performs the process in accordance with the loaded program, whereby the computer executes the calculating process, which is described below.

In step S601, the CPU 501 reserves areas for storing data items calculated in the following steps for virtual lattice points disposed in a space including a fluid that is subject to calculation.

In step S602, since data items of the momenta and mass densities of the fluid are also stored as initial values at the lattice points in the external storage device 507, the CPU 501 reads and stores the data items in the areas reserved in step S601. Accordingly, in the areas for the lattice points, corresponding initial values at the lattice points are stored.

In addition, areas for storing values (data) that are substituted for the variables in the following calculation are reserved in the RAM 502. Times corresponding to time steps n, n+½, and n+1 are stored as variable values.

In step S503, the momenta and mass densities of the fluid are calculated based on the above-described calculating process by using the initial values stored in the areas for the lattice points.

Once calculation of all the lattice points has finished, the process proceeds to step S604, and the results of the calculation are displayed on the display screen of the display device 506. Although the display form is not particularly limited, numerical values obtained for the lattice points may be displayed in a list form, and a computer graphics image indicating the behavior of the fluid based on the numerical values obtained for the lattice points may be generated and displayed.

In step S605, it is determined whether or not steps S603 and S604 have been performed a predetermined number of times, that is, it is determined whether or not steps S603 and S604 have been performed until the time step value reaches an upper limit. If steps S603 and S604 have been performed, the process ends. If steps S603 and S604 have not been performed, the process returns to step S603 and the subsequent steps are repeatedly performed.

From the foregoing description, it is clear that, in the above embodiment, calculation of a pressure term using a central difference can be executed by using calculus of finite differences while defining, at the same point, the distribution of physical quantities describing incompressible fluid states such as a pressure, momentum, and mass density. In addition, since definition points of spatial components of momentum can be placed at the same point, a method of evaluating an advective term is simplified.

In addition, obviously, the fluid analyzing technology provided by the present invention can be also achieved such that a system or an apparatus is provided with a recording medium (or a storage medium) containing program code of software realizing the functions of the foregoing embodiment, and a computer (or a CPU or a microprocessor unit (MPU)) of the system or apparatus reads and executes the program code of the recording medium. In this case, the program code read from the recording medium, itself, realizes the function of the foregoing embodiment, and the recording medium containing the program code is included in the present invention.

Obviously, the present invention includes not only a case in which the functions of the foregoing embodiment are realized such that the computer executes the read program code, but also a case in which, based on instructions of the program code, an operating system (OS) running on the computer performs all or part of actual processing and the processing realizes the functions of the foregoing embodiment.

Furthermore, obviously, the present invention includes a case in which, after the program code read from the recording medium is written in a memory provided in an add-in card loaded into the computer or in an add-in unit connected to the computer, a CPU or the like provided in the add-in card or unit performs all or part of actual processing on the basis of instructions of the program code and the processing realizes the functions of the foregoing embodiment.

When the present invention is applied to the recording medium, the program code corresponding to the above-described flowchart is stored in the recording medium.

Although the present invention has been described in a form thereof with a certain degree of particularity, many apparently widely different embodiments of the invention can be made without departing from the spirit and the scope thereof. It is to be understood that the invention is not limited to the specific embodiments thereof except as defined in the appended claims.

This application claims the benefit of Japanese Application No. 2004-363676 filed Dec. 15, 2004, which is hereby incorporated by reference herein in its entirety.

What is claimed is:

1. An information processing apparatus for analyzing an incompressible fluid movement, comprising:

an initial value storing unit which stores initial values of momenta and mass densities at virtual lattice points disposed in a space set based on the assumption that a fluid subject to calculation exists in the space;

a calculating unit which calculates, based on the initial values, momenta and mass densities at times during a movement of the fluid; and a display for outputting results of the calculating unit, wherein the calculation unit comprises:

a temporal development unit which, during first, second and third consecutive times during movement of the fluid in order of a lapse of time, performs calculation by using one type of lattice for the first and third times and a different type of lattice for the second time, and which, regarding advection of momenta and mass densities, temporally develops the momenta and mass densities at the first time to the third time in accordance with a conservation law by using an upwind velocity field at the second time;

a pressure determining unit which determines a pressure at the second time so that a velocity field derived from momenta at the third time satisfies an incompressibility condition; and a correcting unit which corrects the velocity field at the third time by adding a change in momentum which is caused by a pressure term using the pressure determined by the pressure determining unit.

2. The information processing apparatus according to claim 1, wherein position vectors $r_M|$ and $r_{\tilde{M}}|$ at lattice points M and $\tilde{M}$ of the two types of lattices are represented by $$\begin{cases} r_M = i\vec{e}_1 + j\vec{e}_2 \\ r_{\tilde{M}} = \left(i+\frac{1}{2}\right)\vec{e}_1 + \left(j+\frac{1}{2}\right)\vec{e}_2 \end{cases}$$

where $i,j \in Z$, $\vec{e}_1=(\Delta x,0)$, $\vec{e}_2=(0,\Delta y)|$ where $\Delta x$ and $\Delta y$ represent lattice intervals.

3. An information processing method in which, in an information processing apparatus including an initial value storing unit which stores momenta and mass densities as initial values at virtual lattice points disposed in a space set based on the assumption that a fluid subject to calculation exists in the space, momenta and mass densities at times during a movement of the fluid are calculated based on the initial values, the information processing method analyzing an incompressible fluid movement, comprising:

a temporally developing step of, during first, second and third consecutive times during movement of the fluid in the order of a lapse of time, performing calculation by using one type of lattice for the first and third times and a different type of lattice for the second time, and regarding advection of momenta and mass densities, temporally developing the momenta and mass densities at the first time to third time in accordance with a conservation law by using an upwind velocity field at the second time;

a pressure determining step of determining a pressure at the second time so that a velocity field derived from momenta at the third time satisfies an incompressibility condition;

a correcting step of correcting the velocity field at the third time by adding a change in momentum which is caused by a pressure term using the pressure determined in the pressure determining step; and an outputting step of outputting the calculated results on a display.

4. The information processing method according to claim 3, further comprising the step of representing position vectors $r_M|$ and $r_{\tilde{M}}|$ at lattice points M and $\tilde{M}$ of the two types of lattices are represented by $$\begin{cases} r_M = i\vec{e}_1 + j\vec{e}_2 \\ r_{\tilde{M}} = \left(i+\frac{1}{2}\right)\vec{e}_1 + \left(j+\frac{1}{2}\right)\vec{e}_2 \end{cases}$$

where $i,j \in Z$, $\vec{e}_1=(\Delta x,0)$, $\vec{e}_2=(0,\Delta y)|$ where $\Delta x$ and $\Delta y$ represent lattice intervals.

5. A computer-readable storage medium storing the computer-readable program as set forth in claim 4.

6. A computer-readable program stored in a storage medium for controlling a computer to perform the information processing method as set forth in claim 3.

* * * * *

UNITED STATES PATENT AND TRADEMARK OFFICE
CERTIFICATE OF CORRECTION

PATENT NO. : 7,203,606 B2  
APPLICATION NO. : 11/275142  
DATED : April 10, 2007  
INVENTOR(S) : Kota Nakano et al.

It is certified that error appears in the above-identified patent and that said Letters Patent is hereby corrected as shown below:

COLUMN 4:

Line 50, "variable i and j" should read --variables i and j--.

COLUMN 5:

Line 10, " $$p_{\left(i+\frac{1}{2},j\right)}^{n+\frac{1}{2}} = \frac{1}{2}\left(p_{D(i,j)}^{n+\frac{1}{2}} + p_{D(i,j+1)}^{n+\frac{1}{2}}\right) \quad ,$$ "

should read $$-- \quad p_{\left(i,j+\frac{1}{2}\right)}^{n+\frac{1}{2}} = \frac{1}{2}\left(p_{D(i,j)}^{n+\frac{1}{2}} + p_{D(i,j+1)}^{n+\frac{1}{2}}\right) \quad , \quad --$$

COLUMN 6:

Line 13, "b+½" should read --n+½--.

COLUMN 9:

Line 9, "calculation" should read --calculating--.

Signed and Sealed this

Seventh Day of October, 2008

JON W. DUDAS  
*Director of the United States Patent and Trademark Office*